Dec. 30, 1952   T. H. BIRCH ET AL   2,623,795
SIDE BEARING
Filed Aug. 13, 1949
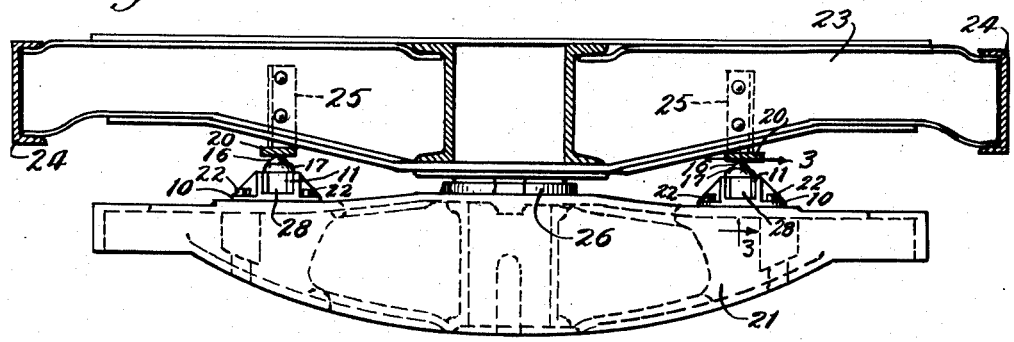
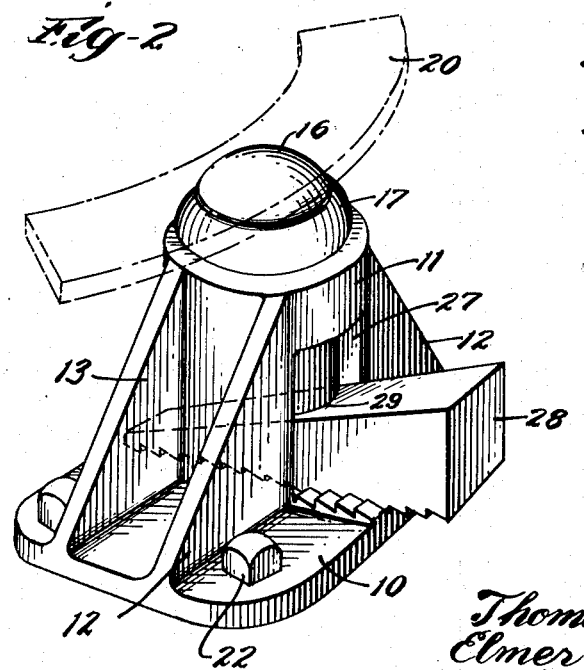
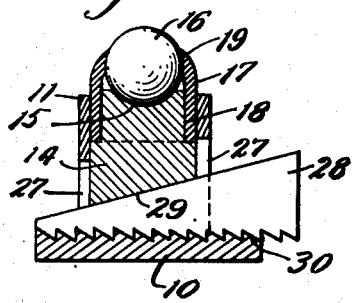
Inventors.
Thomas H. Birch &
Elmer F. Reinke
By: Mann and Brown
Attys.

Patented Dec. 30, 1952

2,623,795

UNITED STATES PATENT OFFICE 2,623,795

SIDE BEARING

Thomas H. Birch and Elmer F. Reinke,
Milwaukee, Wis.

Application August 13, 1949, Serial No. 110,204

2 Claims. (Cl. 308—225)

This invention relates to side bearings for railroad cars, and has for its principal object to provide anti-friction bearings between the car body and the car trucks that will maintain constant bearing contact on curves at track elevations and stabilize the transverse action in high speed service.

In the drawings:

Fig. 1 is a somewhat diagrammatic view showing the side bearing embodying this invention between the truck bolster and body bolster;

Fig. 2 is a perspective view of the side bearing; and

Fig. 3 is a vertical section on the line 3—3 of Fig. 1.

The truck side bearing has a steel mounting bracket including a base 10 and an upstanding barrel 11 braced to the base by gussets 12 and 13. The inside of the barrel 11 is machined to receive the machines outside of a ball bearing support 14 having a spherical seat 15 for a steel or glass ball 16 held in place by a cupped retainer 17 telescoped over the reduced end 18 of the support 14, and provided with a dust seal 19. Thus, the ball is encased in the cupped retainer and held against displacement while given freedom of rotation in the seat 15.

The ball cooperates with a curved body side bearing including a circular wear plate 20 having its lower surface slightly tapered adjacent to each end, thereby retarding any tendency of tipping of the cars at high speed.

The steel mounting bracket of the truck side bearing is adapted to be secured to a truck bolster 21 by bolts 22, and the body side bearing is adapted to be secured to the body bolster 23 of the car underframe 24 by brackets 25.

In this diagrammatic illustration shown in Fig. 1, the truck bolster 21 supports the body bolster and side frame on the center bearing 26.

The truck side bearing is adjustable by shifting the ball supporting member 14 with the ball 16 and retainer 17 in the barrel 11. As here shown, the barrel is provided with a transverse slot 27 adapted to receive a wedge 28 between the base 10 and inclined lower end 29 of the bearing support 14.

The ball bearing is adjusted upwardly by tapping the large end of the wedge 28 with a hammer. It is retained in adjusted position by knurling or teeth 30 on the cooperating surfaces of the wedge 28 and base 10, shown somewhat exaggerated in Figs. 2 and 3.

Considering the side bearings as a whole, they provide an adjustable, frictionless ball side bearing on the truck cooperating with a hardened circular steel wear plate on the body, and maintaining uniform contact through all the normal turns of the truck with respect to the body in rounding curves and taking variable track elevations. The use of the wedge gives ready adjustment as to the height of the ball, and the slight tapering at the ends of the wear plate on the lower side will maintain proper contact and prevent tipping of the cars at high speed.

We claim:

1. In a side bearing for a railroad car, a bracket mounted on a truck bolster comprising a base having a raised, transverse, toothed segment, an upstanding barrel mounted over said raised segment, said barrel having transverse slots aligned with said segment, a wedge inserted through said slots having a toothed lower surface in engagement with said segment and an inclined smooth upper surface, a ball support slidably mounted in said barrel having a smooth inclined lower end resting on the upper face of said wedge and a recessed upper end, a ball bearing positioned in said recess, and a ball retainer attached to said ball support and engaging said ball.

2. A railroad car side bearing comprising a bracket mounted on a truck bolster, said bracket consisting of a base having a raised, transverse, toothed segment, an upstanding barrel mounted over said raised segment, said barrel having transverse slots aligned with said segment, a wedge inserted through said slots having a toothed lower surface in engagement with said segment and an inclined smooth upper surface, a ball support slidably mounted in said barrel having a smooth inclined lower end resting on the upper face of said wedge, and a recessed upper end, a ball bearing positioned in said recess, a ball retainer attached to said ball support and engaging said ball, and an arcuate wear plate mounted on a body bolster, said ball bearing being in bearing contact with the underside of the wear plate.

THOMAS H. BIRCH.
ELMER F. REINKE.

REFERENCES CITED

The following references are of record in the file of this patent:

UNITED STATES PATENTS

| Number | Name | Date |
|---|---|---|
| 563,145 | Duffield et al. | June 30, 1896 |
| 1,108,054 | Wolfe | Aug. 18, 1914 |
| 1,184,343 | Guyer | May 23, 1916 |
| 1,246,699 | Barto | Nov. 13, 1917 |
| 1,759,717 | Seasholtz | May 20, 1930 |
| 2,156,706 | Severn | May 2, 1939 |